United States Patent [19]

Rizzo

[11] 4,331,891
[45] May 25, 1982

[54] HIGH POWER EFFICIENT FREQUENCY CONVERSION OF COHERENT RADIATION WITH NONLINEAR OPTICAL ELEMENTS

[75] Inventor: Joseph E. Rizzo, Pittsford, N.Y.

[73] Assignee: The University of Rochester, Rochester, N.Y.

[21] Appl. No.: 145,410

[22] Filed: May 1, 1980

[51] Int. Cl.³ .............................................. H03F 7/04
[52] U.S. Cl. ....................................... 307/427; 307/425
[58] Field of Search ........................ 307/427, 425, 426

[56] References Cited

U.S. PATENT DOCUMENTS 4,048,515 9/1977 Liu ........................................ 307/427

Primary Examiner—David C. Nelms
Assistant Examiner—Darwin R. Hostetter
Attorney, Agent, or Firm—Martin LuKacher

[57] ABSTRACT

Frequency conversion, particularly tripling of coherent radiation of high intensity laser beams in the red or infrared (approximately 1.06 micrometers), is obtained at high efficiencies by operating a nonlinear optical element, such as a nonlinear crystal, at an efficiency of conversion to a first frequency that results in optimal input to the same or another nonlinear optical element for efficient conversion to a second frequency over a wide range of input beam intensities. An input beam from a Nd:glass laser operating at about 1.06 micrometers can be converted to a high quality output beam of triple the frequency, about 0.35 micrometers, with an overall conversion efficiency in excess of 75%.

12 Claims, 7 Drawing Figures

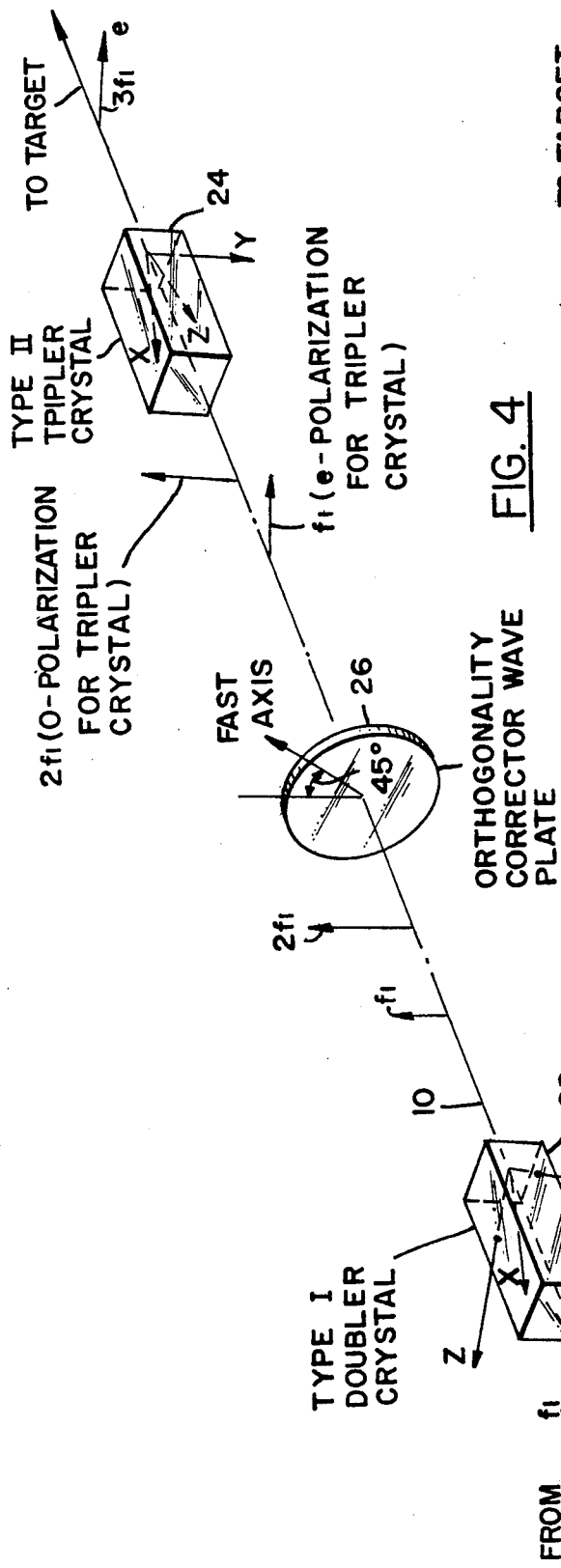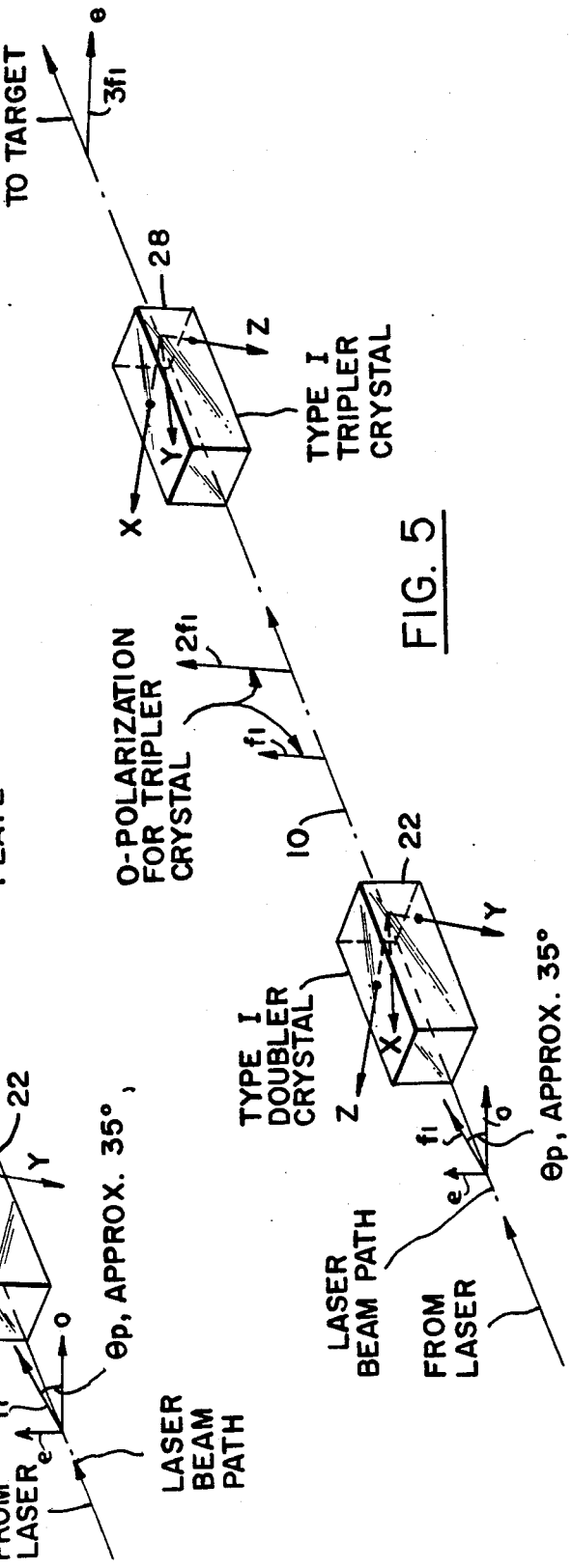

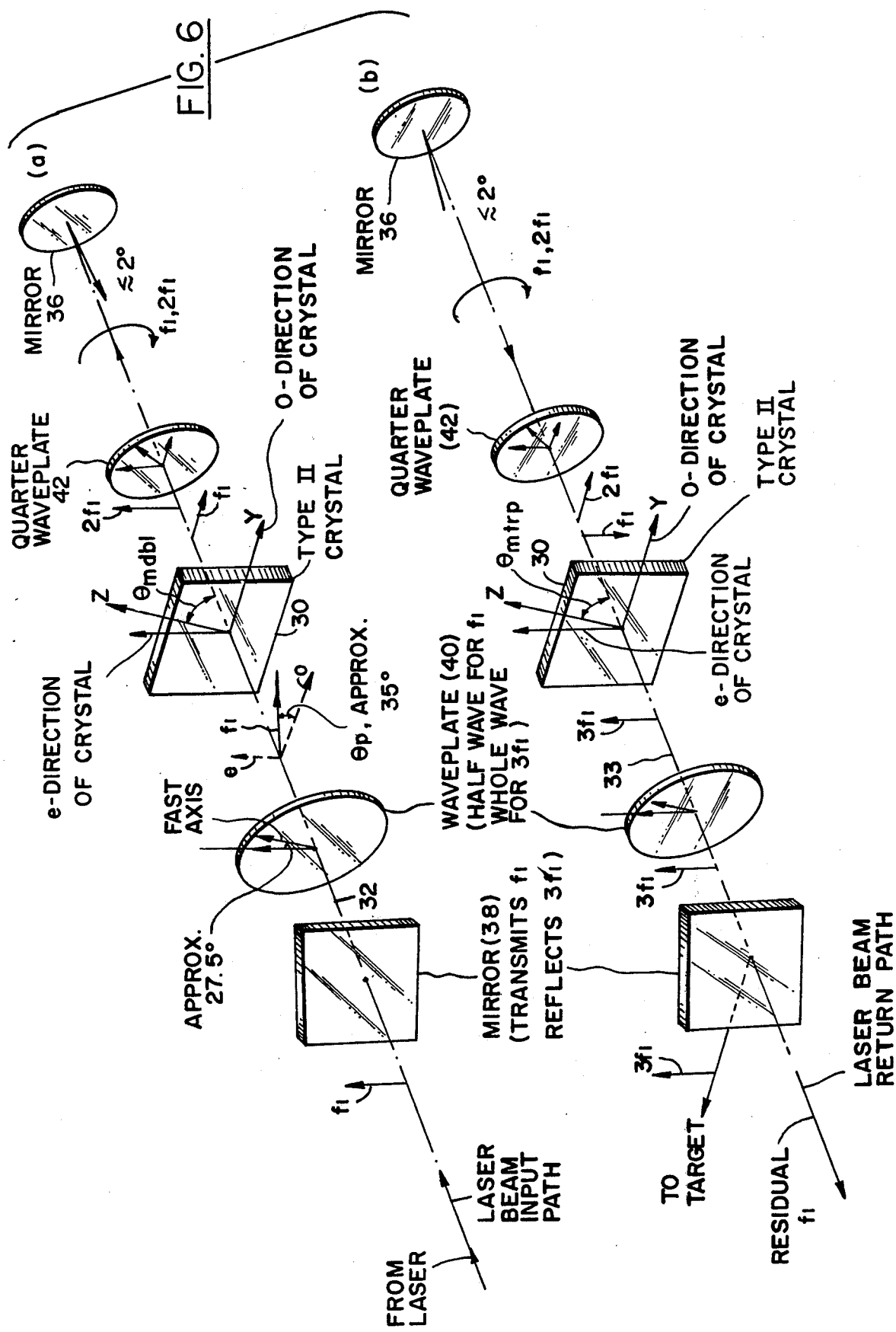

HIGH POWER EFFICIENT FREQUENCY CONVERSION OF COHERENT RADIATION WITH NONLINEAR OPTICAL ELEMENTS

DESCRIPTION

The present invention relates to methods and apparatus for converting the frequency of coherent radiation, and particularly to frequency conversion methods and apparatus using nonlinear optical elements, such as crystals having nonlinear optical coefficients which are useful for tripling the frequency of a beam of input coherent radiation.

This invention is related to the invention of an application, Ser. No. 145,409 filed in the name of Robert Stephen Craxton Concurrently with this application and assigned to the same assignee as this application. This application is also related to U.S. patent application Ser. No. 94,402, filed Nov. 15, 1979 in the name of Stephen D. Jacobs which is entitled, System for Converting the Frequency of Coherent Radiation, which is assigned to the same assignee as this application.

The invention is especially suitable in tripling the frequency of high power laser beams having large apertures, such as the approximately 1.06 micrometer output from a neodymium glass (Nd:glass) laser which may result in increased absorption and increased neutron production by a material containing fusion fuel when irradiated by the tripled high power beam at approximately 0.35 micrometer.

Nonlinear optical elements such as birefringent cyrstals have been used for converting the frequency of laser beams. The interaction of the beams in such elements have been studied and the principles of such interactions described at length in a paper entitled, Interactions between Light Waves in a Nonlinear Dielectric, by J. A. Armstrong, N. Bloembergen, J. Ducuing and P. S. Pershan, *Physical Review*, Volume 127, Number 6, (1918-1939), 1962. The authors of this paper noted certain energy transfer relationships in the nonlinear elements, which result in reconversion of the harmonic frequency components back into fundamental frequency components in the elements. This is a function of the relative optical energy (numbers of photons) of the harmonic and fundamental components in the nonlinear element. The energy in the optical element depends upon the intensity of the input laser beams passing through the element. Such beams in practice have non-constant temporal shapes and sometimes non-uniform spatial profiles. Even when the nonlinear elements are arranged for optimum phase matching the energy relationships and realistic laser beams give rise to reconversion and loss of efficiency.

It has heretofore been proposed only to provide optimum matching of the polarization directions and optimal orientations of the direction of propagation of the laser beam with the optical axis of the nonlinear elements. Such approaches have improved efficiency, but have nevertheless been limited to conversion efficiency of around 30% where tripling is required. Multiple conversions such as the tripling of the frequency of laser beams are needed particularly to provide, from infrared light (e.g., of about 1.06 micrometers—called "red" for convenience hereinafter), high power energy in the near ultraviolet region (e.g. of about 0.35 micrometers—hereinafter called "blue" for convenience). It is now important to triple the frequency of red light to obtain blue light, because, high intensity laser beams in the near ultraviolet are presently readily obtainable only from lasers operating in the near infrared region, such as from Nd:glass lasers.

Where frequency tripling has been reported using crystals having nonlinear optical coefficients, particularly with two nonlinear crystals in the beam path, efforts have been directed to obtain phase matched relationships between the fundamental and second harmonic waves in the first crystal and between the fundamental and harmonic components of the wave in the second crystal to optimize harmonic generation in both crystals (see Okada and Iein, *Japan Journal of Applied Physics*, Volume 10, page 808 (1971); Attwood, Pierce and Coleman, *Optics Comm.*, Volume 15, Number 1, page 10, 1975; Kung, Young, Bjorklund & Harris, *Phy. Rev. Lett.*, Volume 29, page 985 (1972); and the above referenced patent application filed in the name of Stephen D. Jacobs). The approaches for tripling discussed in the above identified references are also consistent with the emphasis on phase matching and proper relationships of the polarizations of the waves applied to nonlinear crystals in various tutorial texts and articles which discuss such crystals and methods for the fabrication thereof (see the text, *Quantum Electronics*, 2nd edition, by A. Yariv, published by John Wiley & Sons, Inc., (1975), see particularly Chapter 16, Sections 16.0 to 16.6); Machewirth el al, *Laser Focus*, May 1976: Anafi et al, *Optical Spectra*, December 1975; and Loiacono, *Acta Electronica*, Volume 18, number 3, page 241 (1975), (see particularly descriptions of methods for growing nonlinear crystals and particularly KDP and CDA crystals). Noncentrosymmetric crystals, especially KDP crystals are suitable for use in the frequency conversion of high intensity (gigawatt per square centimeter range) laser energy in the red frequency region. A first crystal doubles or generates the second harmonic of the red laser beam to produce a beam in the green (approximately 0.53 micrometer from a 1.06 fundamental laser beam). The second harmonic or green component is combined and mixed with the fundamental in the second crystal to produce an output blue beam. Conversion efficiencies from red to blue light have not been reported to exceed about 30%.

Accordingly it is an object of the invention to provide improved methods and apparatus for the frequency conversion of coherent radiation with high efficiency.

It is a further object of the invention to provide improved methods and apparatus for converting the frequency of coherent radiation which overcomes the limitation of reconversion of the frequency of the beam from the desired output frequency back into an input frequency thereof in the nonlinear optical elements in which frequency conversion occurs.

It is a still further object of the invention to provide improved methods and apparatus for tripling the frequency of coherent radiation, such as tripling an input beam from a Nd:glass laser operating at approximately 1.06 micrometers to produce an output beam at approximately 0.35 micrometers.

It is a still further object of the invention to provide improved methods and apparatus for tripling high power laser radiation using crystals having nonlinear optical coefficients with overall conversion efficiencies of approximately 75% and more.

It is a still further object of the present invention to provide improved methods and apparatus for frequency conversion of coherent radiation in which the need for optical elements, such as wave plates to provide proper orientations of polarization, may be eliminated thereby reducing the number and complexity of optical components necessary for obtaining frequency conversion of such coherent radiation.

It is a still further object of the invention to provide improved methods and apparatus for frequency converting high power laser beams and particularly for tripling the frequency of such beams which can be scaled so as to be suitable for use at various power densities, for example 2 to 5 gigawatts per square centimeter and higher.

It is a still further object of the present invention to provide improved methods and apparatus particularly suitable for use in large aperture, high power laser systems, such as Nd:glass fusion lasers.

It is a still further object of the present invention to provide improved methods and apparatus for frequency conversion and particularly for tripling of the frequency of laser beams which operate satisfactorily and with high efficiency in spite of variations in intensity, both temporally or spatially of such beams and in spite of beam divergence or misalignment.

It is a still further object of the present invention to provide improved methods and apparatus for frequency conversion, and particularly for the tripling in frequency of laser beams, which may use either type I or type II nonlinear crystals and which is insensitive to non-uniformity of crystal thickness over the laser beam aperture and allows for flexibility of choice of crystal thickness while providing high efficiency of frequency conversion.

Briefly described, the present invention obtains high efficiency of frequency conversion of an input beam of coherent radiation through the use of two stages of conversion. In the first stage a nonlinear optical element and the directions of polarization and propagation of the beam are arranged so as to provide a conversion efficiency versus beam intensity characteristic which is less than optimal for that stage alone, but nevertheless is substantially constant over a wide range of beam intensity. The conversion efficiency is selected to provide the proper mix of frequency components, with the polarization directions thereof located to provide optimum conversion efficiency in the second stage. The frequency components are combined and mixed in the second stage with the number of photons in the second stage approximately equal for each frequency component, such that substantially complete combination and conversion into optical energy at a third frequency is obtained.

In a preferred embodiment of the invention the first and second stages contain a type II nonlinear crystal and are disposed successively along the beam path. The polarization direction of the fundamental component in the input beam from the laser is arranged by orienting the crystal or through the use of wave plates to be at an angle approximately equal to $\tan^{-1} 1/\sqrt{2}$. This angle is approximately 35 degrees and provides approximately twice the energy in the ordinary direction in the crystal than in the extraordinary direction therein. The frequency of the radiation is doubled in the crystal with efficiency of approximately 67% (preferably near the peak of the efficiency characteristic) due to the energy relationships obtained by the orientation of the polarization directions of the beam with respect to the crystal. The efficiency relationship remains at approximately 60% (between 60% and 70%) over a wide range of input laser beam intensity. Accordingly, the ratio of the intensity of the doubled or second harmonic component to the fundamental component of the beam at the output of the crystal remains approximately 2 to 1 over an entire laser pulse notwithstanding variations in intensity, both temporally and spatially. Where the input beam is red the output beam contains a green component and a red component in 2 to 1 energy relationship. In other words there is twice as much green energy than red energy and therefore equal numbers of green and red photons. In the second crystal, the energy relationships are optimal for mixing or combination to convert the beam to the third harmonic or triple the frequency of the input beam. The polarization relationship resulting from the doubling action in the first crystal automatically provides fundamental and doubled or second harmonic components in orthogonal relationship, such that the extraordinary and ordinary directions in the second crystal can readily be aligned therewith. The output beam is provided tripled in frequency, or at the third harmonic of the input beam, with high efficiency in spite of the lower conversion efficiency in the doubler crystal. Efficiencies of conversion from red to blue of approximately 75% or more are obtainable. It has been found that 75% overall efficiency of conversion of tripling can be obtained with non-optimal crystals and a spatially modulated laser beam. Greater than 80% efficiency is theoretically obtainable using optimal crystals and less spatially modulated laser beams. This is more than twice the efficiency previously reported for tripling of red radiation (see the above referenced article by D. T. Attwood et al).

The invention of the above referenced application of Robert Stephen Craxton provides the generic features and various embodiments for frequency conversion and particularly for tripling using two stages each having the nonlinear optical element disposed successively in the path of the laser beam. The invention of this application provides a two-stage system using a single crystal wherein the beam is passed twice (double passed) through the crystal in opposite directions.

The foregoing and other objects, features and advantages of the invention, as well as the best modes of operation thereof presently known and the presently preferred embodiments thereof, will become more apparent from a reading of the following description in connection with the accompanying drawings in which:

FIG. 1 is a block diagram schematically illustrating methods and apparatus for frequency conversion of coherent radiation provided in accordance with this invention;

FIG. 2 is a curve illustrating the doubler or second harmonic conversion efficiency (the ratio of output energy at twice the fundamental frequency to input energy at the fundamental frequency, expressed in percent, for an exemplary KDP Type II crystal 9 mm thick, the solid curves corresponding to an input polarization angle $\theta_p$ equal to $\tan^{-1} 1/\sqrt{2}$ to the ordinary axis of the crystal and mismatch angles (deviations, $\Delta\theta$, from the phase match angle $\theta_m$ equal to 0° (no mismatch) and 300 microradians). The dotted curves are for an input polarization angle $\theta_p$ of 45° to the ordinary axis of the crystal and mismatch angles $\Delta\theta = 0°$ and 800 microradians. The intensity is in terms of power density (Gigawatts per square centimeter-GW/cm²);

FIG. 3 is a perspective diagram schematically illustrating the presently preferred embodiment of the invention of Robert Stephen Craxton for tripling the frequency of an input beam of red laser energy;

FIG. 4 is a perspective diagram similar to FIG. 3 illustrating another embodiment of the invention of Robert Stephen Craxton;

FIG. 5 is another perspective diagram similar to FIG. 3 which illustrates still another embodiment of the invention of Robert Stephen Craxton;

Figure 7:
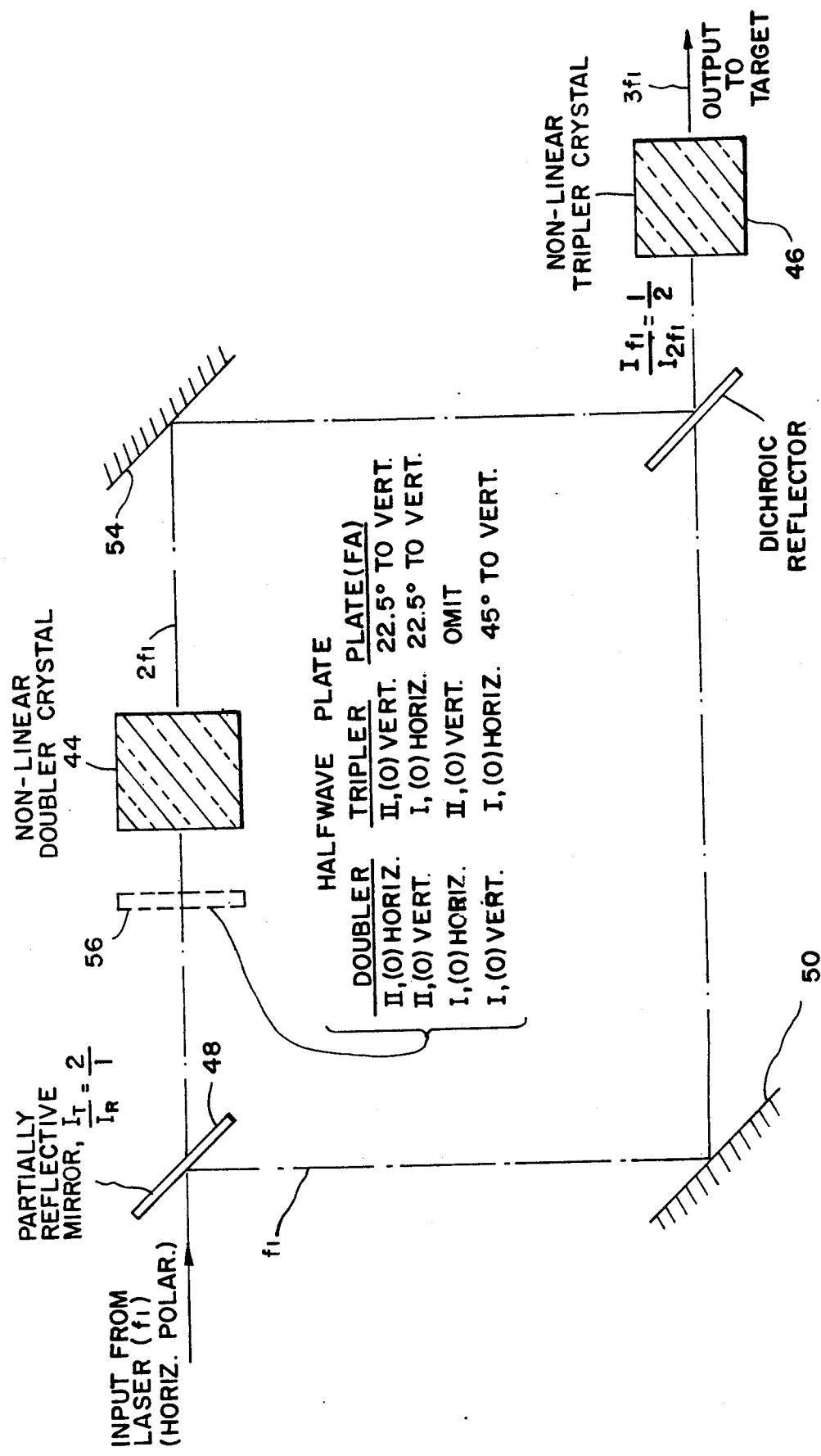

FIG. 6 is a perspective diagram schematically illustrating apparatus using a double path of the laser beam through a single crystal for tripling the frequency of the beam which is in accordance with the invention described and claimed in the above-identified application filed concurrently herewith in the name of Joseph E. Rizzo; Part (a) of FIG. 6 and Part (b) of FIG. 6 being similar but showing the laser beam input path and the laser beam return path during the forward and return paths through the crystal, respectively; and FIG. 7 is a schematic diagram illustrating a still further embodiment of the invention of Robert Stephen Craxton.

Figure 1:
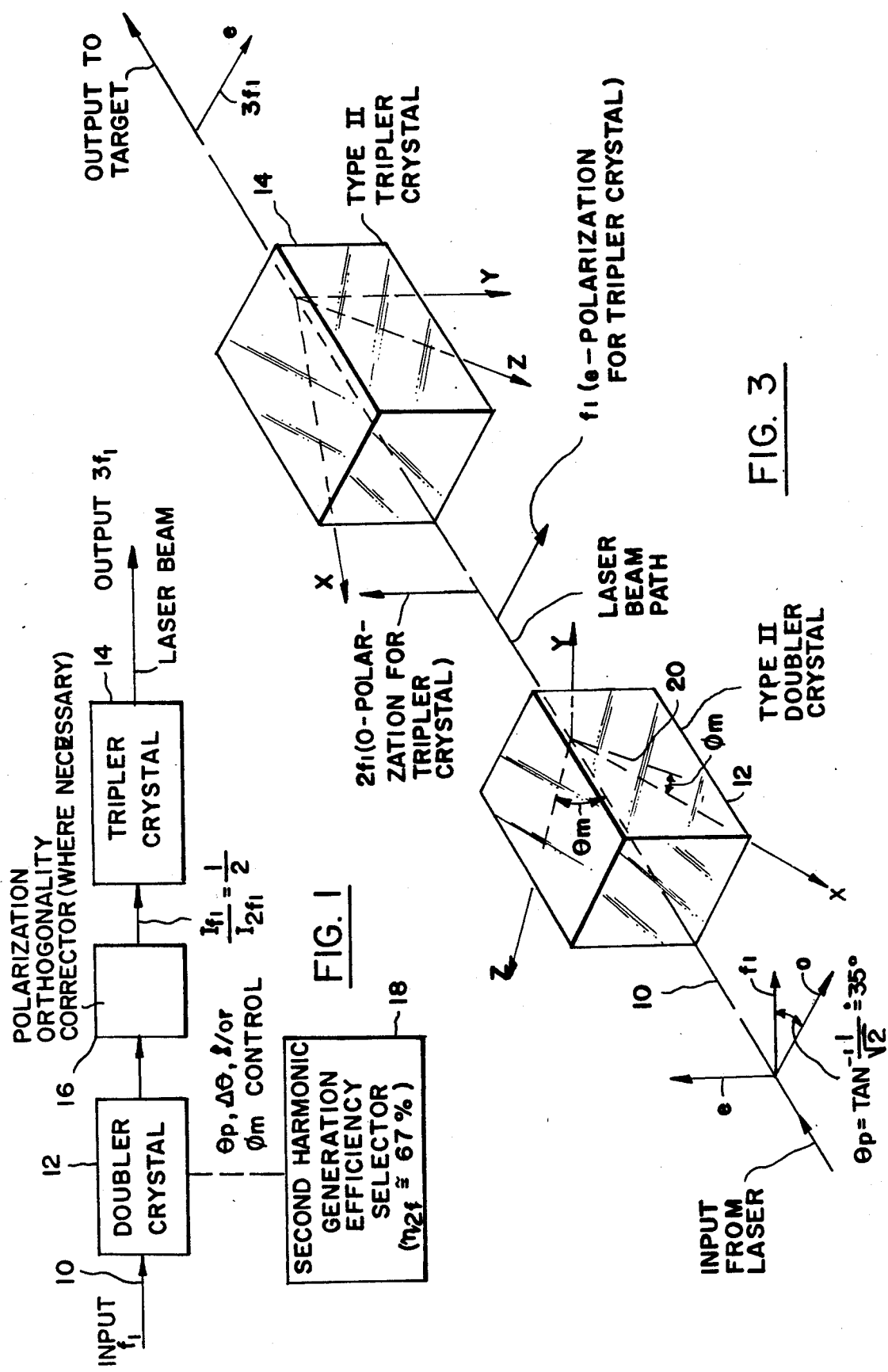

Referring first to FIG. 1, there is shown, schematically, a frequency conversion system for coherent radiation from a source thereof which generates a beam of the radiation at a fundamental frequency $f_1$. The source may be a laser. The beam travels along a beam path 10 through two frequency conversion stages 12 and 14, containing optical elements having nonlinear optical coefficients. The first stage 12 may be provided by a crystal having non-linear optical coefficients such as a KDP crystal or a crystal made of the other materials, CDA and ADP mentioned above, or of some other birefringent, optically transmissive material. The second stage of frequency conversion 14 may contain a similar crystal to that used in the first stage 12.

In the preferred embodiment of the invention of Robert Stephen Craxton, the frequency of laser light is increased by doubling the fundamental frequency $f_1$ in the first stage 12; the crystal therein operating as a doubler crystal and passing the second harmonic $2f_1$ and the fundamental $f_1$ along the beam path 10 to the crystal in the second stage 14 which functions as a tripler crystal. A polarization corrector wave plate 16 which presents different retardation to a fundamental and second harmonic component may be used to correct the orthogonality of these components so that they are presented to the tripler crystal in proper polarization directions from tripling therein. The output from the tripler crystal contains the third harmonic $3f_1$. It is particularly desirable that this third harmonic be provided with optimal conversion efficiency from the input laser beam.

Optimal frequency tripling requires that equal numbers of fundamental and second harmonic photons be present in the beam which passes through the tripler crystal. Because the second harmonic photons are of twice the energy of the fundamental photons, (from Planck's equation), the ratio of intensity of the fundamental component of the beam, $I_{f1}$, to the intensity of the second harmonic, $I_{2f1}$ is then one to two. This energy relationship for optimum tripling corresponds to a conversion efficiency from fundamental to second harmonic energy in the doubler crystal which is less than would be optimal for doubling alone; particularly a 67% conversion efficiency. By maintaining a 67% conversion efficiency in the doubler crystal for most rays in the laser beam and optimal efficiency in the tripler crystal, the net efficiency of conversion of the input energy at the fundamental frequency into output energy at the tripled or third harmonic frequency is optimized for the conversion system.

Figure 2:
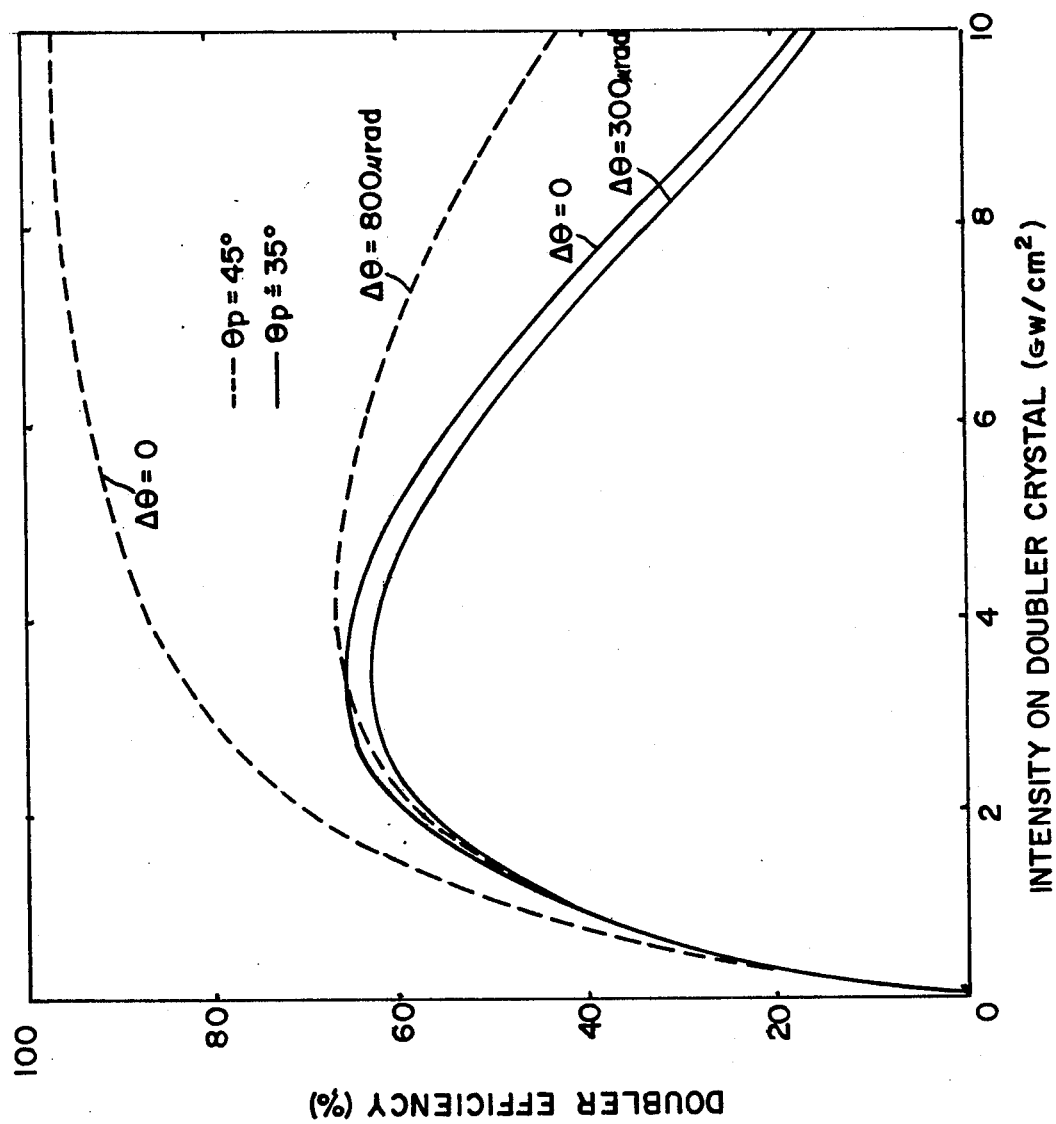

The conversion efficiency of a non-linear optical element, such as the non-linear crystals used in the system shown in FIG. 1, depends upon the intensity of the radiation incident thereon. This intensity may be expressed in terms of the power density on the face of the crystal upon which the laser beam is incident. The curves of FIG. 2 shows the efficiency versus intensity characteristics for a doubler crystal of KDP, nine millimeters in thickness along the direction of the beam path 10. The curves are for a type II crystal and are exemplary of type I crystals so far as the dash line curves are concerned. These curves show that the intensity dependent efficiency characteristic may be varied so as to obtain the requisite (approximately 67%) conversion efficiency over a wide range of intensity, by means of a second harmonic generation efficiency selector mechanism 18 (FIG. 1) which is operative to control the polarization angle $\theta_p$, the angle $\Delta\theta$ of deviation from the phase match angle $\theta_m$ individually or in combination. Control of efficiency is also obtained by adjusting an azimuthal angle $\phi_m$. It will be observed from FIG. 2, that the efficiency varies with the polarization angle $\theta_p$ as well as with the deviation from the matching angle $\Delta\theta$. Both angles can be varied but by orienting the crystals with respect to the laser beam. $\phi_m$ determines the magnitude of the non-linear optical coefficients of the crystals. Inasmuch as the efficiency intensity characteristics scale as a function of the product of the non-linear coefficient, the thickness of the crystal in the direction of the beam therethrough and the square root of the intensity of the beam, by cutting the crystal with a non-optimum azimuthal angle $\phi_m$ to reduce the effective non-linear coefficient, a thicker crystal may be used, where such a thicker crystal is convenient to handle.

The meaning of the polarization angle $\theta_p$, the matching angle $\theta_m$ and the angle $\phi_m$ will be more apparent from FIG. 3 which shows, by way of example, a type II doubler crystal. The direction of beam propagation 10 is shown by the line made up of long and short dashes. The crystal has an optic (Z) axis which is mutually orthogonal to the x and y axes of the crystal. The extraordinary (e) direction of polarization of the crystal is in the x-z plane, if $\phi_m$ is zero which usually is the case. This plane is usually marked on the crystals by the manufacturer, and may be the projection of the optic (z) axis on the side or entrance face of the crystal through which the input beam from the laser enters the crystal. The ordinary (o) direction of polarization of the crystal is in the x-z plane and is perpendicular to the projection of the optic axis on the crystal entrance face. The phase match angle $\theta_m$ is the angle between the optic (z) axis and the direction of propagation of the beam 10 that yields maximum doubling efficiency. This angle varies depending on the crystal material and the wavelength of the beam. For laser radiation of approximately 1.06 micrometers, this angle $\theta_m$ is approximately 59° for KDP type II crystals. The deviation from phase match of the angle between the optic (z) axis and the direction of propagation is $\Delta\theta$. The azimuthal angle $\phi_m$, which is determinative of the non-linear optical coefficients of the crystal, may be defined as the angle between the projection of the direction of beam propagation on the x-y plane and the x crystal axis. The projection is indicated by the reference numeral 20 in FIG. 3. The polarization angle $\theta_p$ is the angle between the polarization direction of the beam and one of the polarization directions of the crystal. As shown in FIG. 3 the ordinary direction of the crystal and the direction of polarization of the fundamental components $f_1$ of the input laser beam is taken as $\theta_p$, the polarization angle.

Non-linear crystals, which may be used in practicing the invention, are available from commercial sources such as Lasermetrics, Inc., of Teaneck, N.J., Cleveland Cystals, Inc., of Cleveland, Ohio; and Interactive Radiation, Inc. of Northvale, N.J.

The variation in conversion efficiency with intensity is believed to be due to photon reconversion effects as discussed in the above referenced article by Armstrong, et al. These effects can be overcome as shown in FIG. 2, by selecting the polarization angle $\theta_p$, the deviation from the phase matching angle $\Delta\theta$, alone or in combination, or together with the non-linear coefficient determining angle $\phi_m$, so as to scale the characteristics and to obtain a crystal thickness which is convenient to handle.

In a perfectly phased matched crystal, where $\Delta\theta$ is equal to 0, equal energy and intensity of the fundamental frequency of radiation of the input beam in the extraordinary and ordinary directions of the crystal are obtained where the polarization angle $\theta_p$ is 45°. Then there are equal numbers of extraordinary and ordinary photons input to the crystal. The dash line curve labeled $\Delta\theta=0$ shows the conversion efficiency characteristics for this condition. The desired 67% efficiency may be obtained, however, only over a very small range of intensity. Realistic laser beams, particularly large aperture beams from high powered lasers, vary in time (temporally) and in space (spatially) in intensity. This variation may be gaussian across the laser pulse in time or across the beam aperture in space. To accommodate such realistic laser beams, the efficiency versus the intensity characteristics for doubling should be substantially constant, say between 60% and 70% efficiency, over a wide range of intensity. FIG. 2 illustrates that this is the case where either the deviation from the matching angle $\Delta\theta$ or the polarization angle $\theta_p$ differ from their optimum value. By changing the polarization angle to an angle equal to $\tan^{-1} 1/\sqrt{2}$ or approximately, 35°, a substantially flat or constant efficiency versus intensity curve may be maintained for the case where the deviation from the matching angle $\Delta\theta$ is zero. This is the preferred embodiment of the invention, inasmuch as it provides at the output of the doubler crystal, second harmonic $2f_1$ and fundamental $f_1$ polarization components which are mutually orthogonal and automatically in line with the ordinary and extraordinary polarization directions of the type II tripler crystal. This preferred embodiment is shown in FIG. 3.

Consider that by the use of a polarization angle $\theta_p$ equal approximately to 35°, the ordinary and extraordinary photons of the input beam are injected into the doubler crystals in a ratio of two to one. This is because the electric field vector in the ordinary direction of the fundamental component $f_1$ at the entrance face of the doubler crystals as shown in FIG. 3 is $\sqrt{2}$ times as large as the component in the extraordinary direction. Since intensity varies with the square of the electric field vector, the number of ordinary photons are in a ratio of two to one to the extraordinary photons in the doubler crystal, by virtue of the polarization angle being equal to $\tan^{-1} 1/\sqrt{2}$ or 35°.

Other combinations of doubler and tripler crystals of different types may be provided and are described in greater detail hereinafter. The crystal thicknesses used for doubling and tripling are substantially the same, as are the phase match angles. Accordingly a single crystal may be used for tripling, where the beam makes a double pass through the crystal. This arrangement is described hereinafter in connection with FIG. 6. The 67% efficiency and one to two ratio of fundamental to second harmonic intensities in the doubling process may also be obtained by bypassing a portion of the fundamental component of the beam before it reaches the entrance face of the doubler crystal. Such an arrangement is described hereinafter in connection with FIG. 7.

Referring in greater detail to FIG. 3., the input may be obtained from a high power Nd:glass laser and propagates along the beam path 10. The frequency of this beam is the fundamental frequency of approximately 1.06 micrometers in the case of a Nd:glass laser. This is red light as defined above. This system of the type II doubler crystal 12 and a type II tripler crystal 14, disposed along the beam path 10, outputs the frequency three times the fundamental frequency which may be referred to as the third harmonic, $3f_1$. This output is directed to a target, such as a laser fusion fuel pellet. The tripled frequency beam is blue as discussed above.

The polarization angle $\theta_p$ of approximately 35° with respect to the ordinary direction of polarization in the doubler crystal 12 (the horizontal direction as shown in FIG. 3) may be obtained by locating the crystal such that its ordinary polarization direction is at approximately 35° to the polarization direction of the linearly polarized input beam at the fundamental frequency $f_1$. Alternatively a wave plate may be used having a half-wave retardation for the fundamental frequency, with its fast axis at approximately 27.5° from the extraordinary (e) direction of the doubler crystal 12 (the vertical as shown in FIG. 3) or 62.5° from the ordinary (o) direction of the doubler crystal 12. The use of such a wave plate to provide the requisite polarization angle of the input beam is discussed hereinafter in connection with FIG. 6. The matching angle $\theta_m$ and the azimuthal angle $\phi_m$ are optimal for the material of the doubler crystal 12 and the wavelengths of the laser beams. The thickness of the crystal 12 is also optimal considering the azimuthual angle $\phi_m$ for harmonic generation in the doubler crystal 12. These optimal angles and lengths are normally provided in crystals furnished from the manufacturers. They may also be determined from the well known equations governing the operation of the crystals which may be found in the above referenced literature.

The orientation of the polarization direction of the input beams of frequency $f_1$ provides for the passage of a portion of the fundamental frequency energy of the beam through the doubler crystal 12 which is not converted into the second harmonic, $2f_1$ energy. This unconverted fundamental energy appears mostly in the ordinary direction of the doubler crystal. The doubled component $2f_1$ appears in the extraordinary polarization direction of the doubler crystal. There is of course residual energy at the fundamental and harmonic frequencies which passes through both the doubler and tripler crystals without contributing to the generation of the third harmonic component. These are not shown to simplify the illustration. Also neglected, for purposes of simplification are losses in the crystals. These losses are relatively small, and theoretically may be about 4% of the input energy for KDP crystals.

Inasmuch as the doubled or second harmonic component, $2f_1$, is at the higher frequency, it is higher in energy than the fundamental component. The energy relationships in terms of the intensity of the fundamental to the second harmonic are, as shown in FIG. 1, one to two. There is one second harmonic photon, albeit of higher energy, for each fundamental photon. This is the optimal relationship for combination of these photons into the third harmonic photons in the tripler crystal 14. Moreover, the polarization directions of the fundamental and second harmonic components are orthogonal. The tripler crystal 14 is therefore aligned with its ordinary axis parallel to the second harmonic polarization component $2f_1$, and its extraordinary axis parallel to the direction of the fundamental components $f_1$. These components combine and mix in the tripler crystal to produce the third harmonic $3f_1$, or blue light, which is linearly polarized in the extraordinary direction for the tripler crystal 14. The tripler crystal 14 is also arranged with respect to direction of propagation of the laser beam 10, so that the angles $\theta_m$ and $\phi_m$ are the proper angles for phase matching considering the frequency of the second harmonic or green light which emanates from the doubler crystal. The matching angle $\theta_m$ in the tripler crystal is within approximately 2° of the matching angle in the doubler crystal.

It will be appreciated that a substantially flat efficiency versus intensity curve for the doubler crystal may also be obtained using an optimal polarization angle at 45° and detuning the doubler crystal by changing the deviation $\Delta\theta$ from the phase matching angle. For example FIG. 2 illustrates that a deviation $\Delta\theta$ of approximately 800 microradians provides a substantially flat efficiency versus intensity curve from approximately 60 to 70% efficiency between 2.5 and 6 GW/cm$^2$ for the crystal depicted in FIG. 2. However, as described in the above referenced application filed in the name of Stephen D. Jacobs, corrector wave plates are required and the system becomes more sensitive to beam divergence or misalignment than in the case of the preferred embodiment shown in FIG. 3. The preferred embodiment is also relatively insensitive to non-uniformity of crystal thickness and will tolerate divergence and alignment errors due to mechanical misalignment or temperature variations. If necessary due to operating conditions, both crystals 12 and 14 may be temperature controlled, for example, by placing them within jackets through which cooling fluid passes.

Referring next to FIG. 4, there is shown a system using a type I doubler crystal 22 and a type II tripler crystal 24. An orthogonality corrector wave plate 26, which imposes a half wavelength retardation for the fundamental and a full wavelength retardation for the second harmonic, is deposed in the beam path between the doubler and tripler crystals 22 and 24. The design of such orthogonality corrector wave plates 26, such as quartz crystals, which serve as retarders having different retardation for different wavelengths is known in the optical engineering art (see for example Lu and Loper, *Journal of the Optical Society of America*, 65, 3, 248 (1975) and Gerchanobskiaya, *Optical Technology*, 41, 3, 185 (1974)).

As described in connection with FIG. 3, the polarization angle $\theta_p$ of approximately 35° results in ⅓rd of the incident energy, which is the component of the fundamental $f_1$ polarized in the extraordinary direction of the crystal 22, to pass therethrough without participating in the doubling process. Most of the fundamental component polarized in the ordinary direction is converted to the second harmonic $2f_1$. Both the unconverted fundamental $f_1$ and the second harmonic $2f_1$ appear in the extraordinary direction of the doubler crystal 22. The wave plate 26 is a halfwave retarder for the fundamental $f_1$ and a whole wave retarder for the second harmonic $2f_1$. The fast angle of the wave plate is set at 45° to the extraordinary direction in the doubler, and causes the fundamental to be rotated 90°. After passing through the wave plate 26, therefore, the second harmonic $2f_1$ is in the ordinary polarization direction of the tripler crystal 24. The fundamental component $f_1$ is in the extraordinary polarization direction for the tripler crystal 24. The tripler crystal operates in the same manner as the type II tripler crystal shown in FIG. 3 and produces blue light (i.e, the 3rd harmonic $3f_1$ coherent radiation) which is directed toward the target or other utilization device.

Efficiency versus intensity characteristics of the type I doubler crystal 22 is similar to the characteristics shown for the type II crystal in FIG. 2. For $\Delta\theta=0$, these characteristics are much like the dash line curve labeled $\Delta\theta=0$, but are somewhat shifted to the right. The efficiency of Type I crystals is somewhat lower than type II crystals. Type I crystals are also more sensitive to divergence of the beam, but are preferable under some circumstances, as where the crystal has a 90° phase matching angle.

FIG. 5 illustrates a system similar to FIG. 4 using a type I doubler crystal 22. Instead of a Type II tripler crystal, a Type I tripler crystal 28 is used. The directions of polarization for the Type I tripler crystal are proper without the need for an orthogonality corrector wave plate when a Type I tripler crystal 28 is used. Otherwise the systems shown in FIG. 4 and FIG. 5 operate in the same manner.

FIG. 6 illustrates a high efficiency tripling system especially suitable for red laser radiation which uses only one crystal 30. The crystal used is indicated as a type II crystal, which is preferred. Type I crystals may also be used. The laser beam input path 32, which passes through the crystal 30, between the opposite sides thereof in one direction is shown in part (a) of FIG. 6. Part (b) of FIG. 6 shows the laser beam return path 33 which passes through the crystal 30 in the opposite direction. These paths are not exactly coincident, but are within an angle of approximately 2° in the case of KDP Type II crystals operating with laser radiation at about 1.06 micrometers. This divergence is indicated at the intersection of the input and return paths 32 and 33 at a mirror 36.

The double pass system is shown in FIG. 6 in two parts solely for purposes of explanation. From the laser source the laser beam input path is through a dichroic mirror 38 which transmits the fundamental $f_1$ but reflects the 3rd harmonic $3f_1$. The beam then passes through a wave plate 40, which is a whole wavelength retarder for the tripled frequency component $3f_1$, but a half wavelength retarder for the fundamental. Such wave plates are sometimes referred to as achromatic wave plates herein. The fast axis FA is approximately 27.5° to the extraordinary direction of the crystal 30. This results in a rotation of the fundamental component $f_1$ to bring it to a polarization angle $\theta_p$ of approximately 35° with respect to the ordinary polarization direction of the crystal 30. The mirror 38 may not be needed if the output beam direction need not be diverted from the input beam direction. The waveplate 40 may not be needed if the crystal orientation is changed or if other means for polarizing the input beam are used. The Type II crystal 30 is oriented so that its matching angle, $\theta_m$ as shown in FIG. 6 is set be the proper angle for phase match condition in crystal 32 functioning as a doubler. The same relationships as described for the Type II doubler crystal 12 in connection with FIG. 3 exists for the Type II crystal 30. The output light from the rear side of the crystal 30 is polarized parallel to the extraordinary direction of the Type II crystal, in case of the double component $2f_1$ and parallel to the ordinary direction of the crystal in case of the fundamental component $f_1$. Inasmuch as the polarization angle $\theta_p$ is approximately 35°, the fundamental has half the energy as the second harmonic; approximately 67% efficiency of doubling being obtained in the Type II crystal, as the laser beam travels along the input path 32 therethrough.

In the illustration, the second harmonic doubled component is vertically polarized while the fundamental component is horizontally polarized. These polarization directions are 90° out of phase from the directions required from tripling in the crystal 30, as the laser beam travels therethrough along the return path 33. To correct the polarization, a quarter wave plate 42 is used between the rear face of the crystal and the mirror 36. This quarter wave plate 42 converts both the fundamental and second harmonic waves to circular polarization. When this circular polarized radiation is reflected from the mirror 36, it is restored to linearly polarized light by the quarter wave plate 42 with both components rotated by 90°. This is because the light returns from the mirror 36 along the return path 33 with the opposite circular polarization that existed on the input path 32, between the quarter wave plate 42 and the mirror 36.

The tripling process is carried out in the crystal 30 with the direction of propagation of the beam along the return path 33 in properly phased matched orientation due to the tilt of the paths 32 and 33 obtained by orientating the mirror 36. Tripled, $3f_1$, light emerges polarized vertically from the front side of the crystal 30. This light passes through the wave plate 40, since it is only retarded by a whole wave, still vertically polarized. The tripled light is reflected by the dichroic mirror 38 towards the target. As is the case with the other systems illustrated above, residual light is not shown to simplify the illustration.

Referring to FIG. 7 there is shown another system using a non-linear doubler crystal 44 and a non-linear tripler crystal 46. An input beam from the laser at the fundamental frequency $f_1$ is split by a partially reflecting mirror 48 which has a transmissivity to reflection ratio of 2 to 1 ($I_T/I_R = 2/1$). One third of the energy is therefore split and bypasses the doubler crystal 44. A mirror 50 reflects the fundamental to a dichroic reflector 52 through which it is transmitted to the tripler crystal 46. Two-thirds of the fundamental is doubled in the doubler crystal 44. The orientation of the doubler crystal may be such that the upper dashed line for $\Delta\theta = 0$ shown in FIG. 2 is the efficiency versus intensity characteristic. The crystal is operated at intensities lying on the flat part of the curve. Accordingly, most of the fundamental is converted to energy at $2f_1$.

A mirror 54 reflects the $2f_1$ from the non-linear doubler crystal 44 to the dichroic reflector 52 where it is reflected and combined with the fundamental beam. The intensity of the fundamental $I_{f_1}$ to the second harmonic $I_{2f_1}$ are therefore in a one to two relationship. This is the optimum relationship for tripling in the tripler 46. The output to the target is the tripled radiation at $3f_1$. The crystals 44 and 46 may either be type I or type II crystals. If the doubler crystal is Type II, a wave plate 56 is used which provides a half wave length retardation for the fundamental $f_1$ to ensure that the fundamental light input to the doubler crystal 44 is polarized at 45° to the ordinary and extraordinary directions of the crystal. As an example, if the fundamental light, $f_1$, is incident from the laser in the ordinary direction of the crystal, the wave plate 56 is oriented so that its fast axis is at 22.5° to the ordinary direction of polarization in the crystal 44 and is similar to the wave plate 40 shown in FIG. 6.

In order to assure that the polarization directions of the doubled radiation and the fundamental as combined at the dichroic reflector are proper for various combinations of type I and type II crystals, the waveplate 56 and the crystals 44 and 46 are oriented as indicated in the table shown in FIG. 7.

From the foregoing description, it will be apparent that there has been provided approved methods and apparatus for converting the frequency of coherent radiation, and particularly for tripling the frequency of such radiation from a laser beam. The invention is especially suitable for use with input red laser light as produced by high power Nd:glass lasers. The invention enables high power red light from such lasers to be converted into blue light with high efficiency. Variations and modifications of the herein described embodiments of the invention will undoubtedly suggest themselves to those skilled in the art. Accordingly, the foregoing description should be taken as illustrative and not in a limiting sense.

I claim:

1. Apparatus for converting the frequency of a beam of coherent radiation which comprises a crystal having nonlinear optical coefficients, said crystal having opposite sides and ordinary and extraordinary polarization directions therein, means defining a double pass for said beam of radiation in opposite directions through said crystal between said opposite sides thereof, means for orienting the polarization of said beam as it propagates in the first of said opposite directions toward said crystal and the polarization directions of said crystal with respect to each other to obtain a first conversion of the frequency of said beam to provide the first and second frequency components therein, and means for orienting the polarization directions of said first and second frequency components and the polarization directions of said crystal with respect to each other as said beam propagates toward said crystal in the second of said opposite directions to obtain the combination of said first and second components into a third frequency component, said first, second and third frequency components being at different frequencies.

2. The apparatus as defined in claim 1 wherein said means defining said double pass through said crystal is operative to provide a predetermined angular displacement between the paths of said beam and as it propagates in said first and second directions sufficient to obtain the phase match angles, $\theta_m$, in said crystal between both of the propagation directions of said beam and the optic axis of said crystal.

3. The apparatus as defined in claim 2 wherein said means defining said double pass comprises a mirror spaced along said beam path on which said beam is incident, said mirror being oriented to provide said predetermined angular displacement.

4. The apparatus as defined in claim 1 wherein said means for orienting the polarization directions of said first and second frequency components comprises a wave plate which presents a quarter wave retardation to said beams on said pass thereof in the first direction and again on said path pass thereof in the second direction after and before said crystal, respectively.

5. The apparatus as defined in claim 4 wherein said means for orienting the polarization of said beam with respect to the polarization directions of said crystal as it propagates in said first direction towards said crystal comprises means for providing a polarization angle $\theta_p$ between the ordinary direction of polarization of said crystal and said polarization direction of said beam equal approximately to $\tan^{-1} 1/\sqrt{2}$.

6. The apparatus as defined in claim 5 wherein said beam enters said first path with a certain direction of polarization, said polarization orienting means as set forth in claim 5 comprises an achromatic wave plate which presents a half wave length retardation for said first frequency component and a whole wave length retardation for said third frequency component, said wave plate having a fast axis oriented at an angle equal to $\frac{1}{2}(90° - \theta_p)$ in the sense toward the ordinary axis of said crystal in the direction of propagation of said beam on said first pass with respect to direction of polarization of said beam as it enters that first pass.

7. The apparatus as defined in claim 6 further comprising a dichroic mirror which transmits radiation of said first frequency and reflects radiation of said third frequency disposed along said beam paths and both of said passes between the entrance of said first pass and said achromatic wave plate to reflect said third frequency in a certain direction.

8. The apparatus as defined in claim 7 wherein said crystal is a type II crystal, said first, second and third components are the fundamental, second and third harmonics of the frequency of the said beam of coherent radiation.

9. Apparatus for tripling the frequency of a beam coherent radiation comprising an optical element having non-linear optical coefficients, means defining a double pass of said beam in opposite directions through said element for doubling the fundamental frequency of said beam on the first pass of said double pass in one of said opposite directions and tripling the frequency of said beam on the second pass of said double pass in the other of said opposite directions.

10. The apparatus as defined in claim 9 further comprising means for providing a conversion efficiency of the energy of said beam into energy at the double frequency thereof of about 67% on said first pass through said element.

11. The apparatus as defined in claim 9 further comprises the means for providing an optical conversion efficiency of the energy of said beams at the fundamental frequency and said double frequency thereof into the triple frequency on said second pass through said element.

12. The apparatus as defined in claim 11 wherein said conversion efficiency providing means comprises means for orienting the polarization directions of said fundamental and doubled frequency components an the polarization directions of said element with respect to each other to be at pre-determined angles.

* * * * *